(12) United States Patent
Kraus

(10) Patent No.: US 7,415,663 B1
(45) Date of Patent: Aug. 19, 2008

(54) ADVANCED LOGIC CONTROLLER THAT DEPLOYS USER CUSTOMIZED LOGIC IN THE ADMINISTRATION OF QUESTIONNAIRES

(76) Inventor: David Ray Kraus, 50 Main St., Ashland, MA (US) 01721

( * ) Notice: Subject to any disclaimer, the term of this patent is extended or adjusted under 35 U.S.C. 154(b) by 410 days.

(21) Appl. No.: 10/689,270

(22) Filed: Oct. 20, 2003

Related U.S. Application Data

(60) Provisional application No. 60/427,060, filed on Nov. 18, 2002.

(51) Int. Cl.
*G06F 17/00* (2006.01)
*G06F 17/30* (2006.01)
*G06Q 40/00* (2006.01)

(52) U.S. Cl. .............. 715/200; 715/234; 715/273; 707/10; 705/35

(58) Field of Classification Search .............. 715/505, 715/204, 229, 234, 243, 273, 738, 744, 760; 707/10, 102; 705/35
See application file for complete search history.

(56) References Cited

U.S. PATENT DOCUMENTS

| | | | | |
|---|---|---|---|---|
| 5,660,176 A | * | 8/1997 | Iliff | 600/300 |
| 5,868,669 A | * | 2/1999 | Iliff | 600/300 |
| 5,960,419 A | * | 9/1999 | Fagg et al. | 706/59 |
| 6,108,665 A | | 8/2000 | Bair | |
| 6,196,970 B1 | * | 3/2001 | Brown | 600/300 |
| 6,289,513 B1 | * | 9/2001 | Bentwich | 717/106 |
| 6,314,556 B1 | * | 11/2001 | DeBusk et al. | 717/107 |
| 6,581,071 B1 | * | 6/2003 | Gustman et al. | 707/104.1 |
| 6,725,447 B1 | * | 4/2004 | Gilman et al. | 717/105 |
| 6,873,992 B1 | * | 3/2005 | Thomas | 707/102 |
| 2002/0035486 A1 | * | 3/2002 | Huyn et al. | 705/3 |
| 2002/0069207 A1 | * | 6/2002 | Alexander et al. | 707/102 |
| 2002/0119433 A1 | * | 8/2002 | Callender | 434/322 |
| 2003/0078810 A1 | * | 4/2003 | Cole et al. | 705/3 |
| 2003/0097280 A1 | * | 5/2003 | Fitzpatrick et al. | 705/2 |
| 2003/0115083 A1 | * | 6/2003 | Masarie et al. | 705/2 |
| 2004/0172520 A1 | * | 9/2004 | Smit et al. | 712/223 |
| 2004/0243586 A1 | * | 12/2004 | Byers | 707/100 |

OTHER PUBLICATIONS

Huyn, et al., "Longitudinal Patient-Centered Collection and Analysis of Clinical Data," IEEE, Nov. 2000, pp. 1-8.*
K. Stroetmann, et al., "Understanding Patients: Participatory Approaches for the USer Evaluation of Vital Data Presentation," ACM, Jun. 2002, pp. 93-97.*
B. Kitchenham, et al., "Principles of Survey Research Part4: Questionnaire Evaluation," ACM, May 2002, pp. 20-23.*

* cited by examiner

*Primary Examiner*—Doug Hutton
*Assistant Examiner*—Maikhanh Nguyen
(74) *Attorney, Agent, or Firm*—Paul E. Lewkowicz P.C.; Paul E. Lewkowicz

(57) ABSTRACT

Computerization has allowed branching and other logic to be integrated into questionnaire administration. The primary purpose of this invention is to allow the functionality and power of these processes to be easily created, and more importantly, customized by users of data collection systems. Rather than one set of logic applying to all users, this invention can be integrated into any computerized questionnaire application and generates a plurality of individualized questionnaires. The system allows and limits each user's customization of logic rules while providing transparent integration that allows different users to select the same questionnaire or battery of questionnaires, but receive overlapping, yet different questions and logic.

8 Claims, 14 Drawing Sheets

FIG. 3

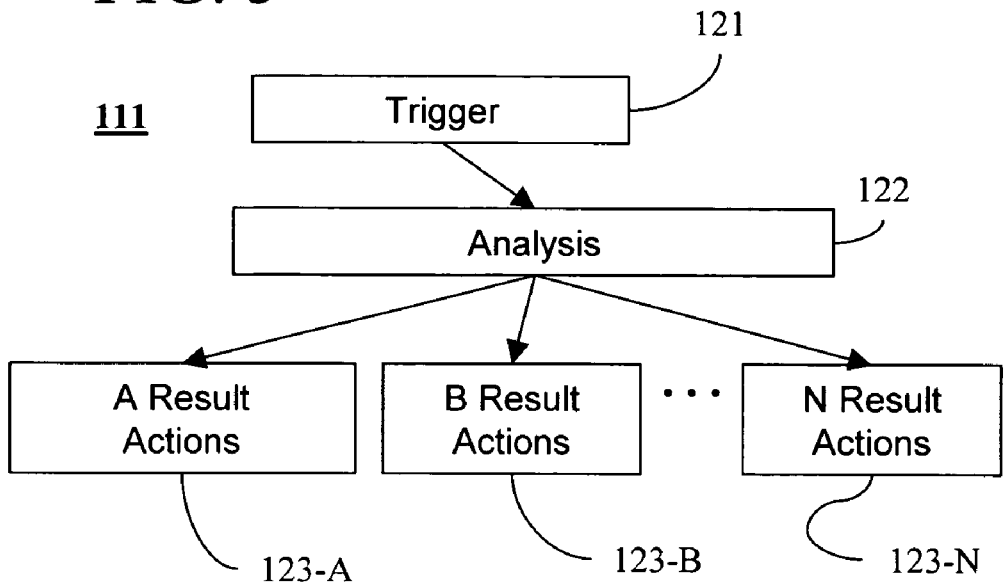

FIG. 4

```
"36qq13192qq1336qq15goalsqq15192qq15{greater}(3,{getPhase}()
)qq1346qq15qq15128qq15{if}({greater}({answerLength}(564),0),{
storeAnswerAsPolicy}(564))qq1450qq15qq15128qq15{if}({greater
}({answerLength}(560),0),{storeAnswerAsPolicy}(560))qq1451qq1
5qq15128qq15{if}({greater}({answerLength}(558),0),{storeAnswer
AsPolicy}(558))qq1346qq15qq1564qq15{if}({greater}(1,{answerL
ength}(564)),{setPleaseAsk}(564,FALSE),{do}({setQBlockAnswer
ReadOnly}(564,TRUE),{setPleaseAsk}(564,TRUE),{setPleaseAsk}
(561,TRUE),{setPleaseAsk}(562,TRUE),{setPleaseAsk}(563,TRU
E)))qq1447qq15qq1564qq15{if}({greater}(1,{answerLength}(560))
,{setPleaseAsk}(560,FALSE),{do}({setQBlockAnswerReadOnly}(5
60,TRUE),{setPleaseAsk}(560,TRUE),{setPleaseAsk}(565,TRUE),
{setPleaseAsk}(554,TRUE),{setPleaseAsk}(559,TRUE)))qq1448qq
15qq1564qq15{if}({greater}(1,{answerLength}(558)),{setPleaseAs
k}(558,FALSE),{do}({setQBlockAnswerReadOnly}(558,TRUE),{s
etPleaseAsk}(558,TRUE),{setPleaseAsk}(557,TRUE),{setPleaseAs
k}(556,TRUE),{setPleaseAsk}(555,TRUE)))"
```

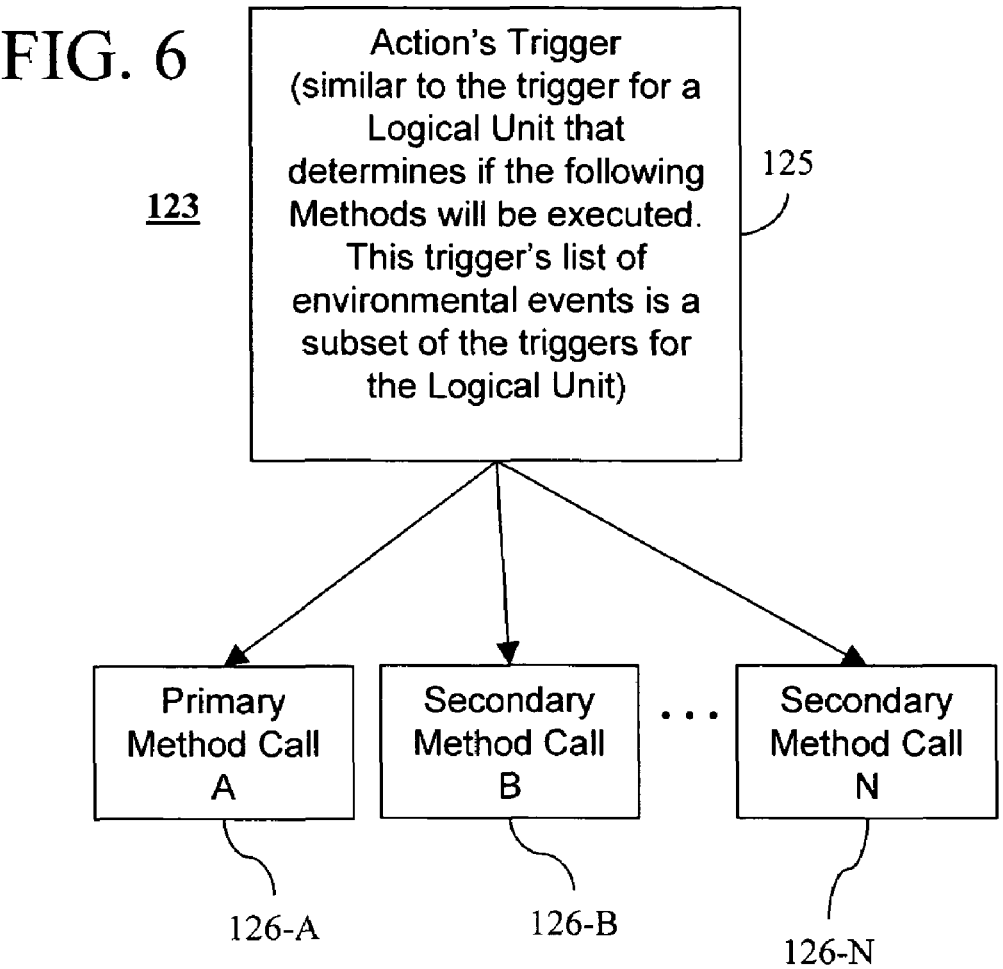

ADVANCED LOGIC CONTROLLER THAT DEPLOYS USER CUSTOMIZED LOGIC IN THE ADMINISTRATION OF QUESTIONNAIRES

CROSS REFERENCE TO RELATED APPLICATION

This application is entitled to the benefit of Provisional Patent Application Ser. No. 60/427,060 filed Nov. 18, 2002 by the present inventors.

MICROFICHE APPENDIX

Byte code of a working example of the preferred embodiment of the present invention. Total number of microfiche is 2. Total number of frames is 186.

BACKGROUND OF THE INVENTION

1. Field of Invention

This invention relates to questionnaires, question sets, surveys, tests, assessments, or other methods of presenting questions sequentially.

2. Background of Invention

In the known art, computerization of questionnaires (e.g. question sets, surveys, tests, assessments, or other methods of presenting questions sequentially) has allowed for the integration of branching logic into the sequencing of data items. For example, based on one or more data elements already collected, one or more data items might be skipped or pre-filled. However, the logic systems seen in the prior art produce one set of branching logic that must be used by all users of the same system. Systems that allow customization of the logic, simply override the standard logic and force all users (of the same computer) through the same "customized" logic. All systems seen in the known art represent one set of rules for all users within the application. Users may experience different questions based on logic rules, but the logic rules are typically "one size fits all."

In order to afford each user personalized logic, a separate computer and software system would need to be deployed for each user. This has presented serious limitations within fields like medicine where, for example, each doctor may have the need to add or revise questions for their specific patient populations in order to feel comfortable adopting a screening or clinical outcome questionnaire. The prior art affords two unreasonable solutions: 1) use a "one-size-fits-all" system, or 2) have a different computer in an emergency room for each ER physician. Obviously neither is a good solution and highlights the limitations of the prior art. Furthermore, a doctor may well wish to customize a questionnaire for each patient rather than requiring a fixed questionnaire for the entire practice. Similarly, in other fields like mortgage lending and human resource departments, there is a need for individual institutions or departments to have the ability to customize questionnaires and forms for their unique purposes, yet allow the public to access what appears to be a single questionnaire from a common point of entry. The prior art does not allow for this level of seamless customization and integration.

Illustrating the prior art, FIG. 1 provides a diagram of a conventional data collection system 106 for controlling the theoretical collection of data in a questionnaire 102 or another standard sequence of questions. In this system, there are a plurality of data elements or questions (104-1 through 104-N) called the standard sequence that may be presented through a data collection interface 101 (e.g. a web form, medical record screen, or an interactive voice recognition system). Each system 106 will conventionally incorporate one standard sequence controller 103 or its functional equivalent to control the sequencing and other branching logic (105-1 thorugh 105-N). After a data element 104-1 has been collected, a set of one or more standardized logic analyses 105-1A are performed. Based on this analysis an action 105-1B is made which impacts on the standard sequence 102, by, for example, skipping over question 104-2 to 104-N. Some known systems allow the logic of the standard sequence controller to be modified or customized. However, this does not afford personalization of the logic for each user, for which the present invention provides a powerful and easy-to-use solution.

The invention of Bair, et. al., U.S. Pat. No. 6,108,665 (2000) is an advanced example of the prior art. Standard questionnaires are available for use over a network with built-in standard logic. Client-side applications are able to create new questionnaires and add questions with rudimentary logic based solely on the answer to one question. But, as with all other known art, a new questionnaire or system would need to be created for each user that needs even minor changes in the branching logic. This leads to a substantial increase in cost, time for deployment, and data and application storage requirements, even for simple changes to the advanced logic. For many applications of the system illustrated in FIG. 1, custom modifications are therefore practically impossible. This is especially true for all fields where time and cost are critical.

In some cases, the professionals within the field where the known art is used may not need to customize the logic within a questionnaire, but between questionnaires, providing a customized battery for each research group or other set of users. For example, if the score of a screening questionnaire is positive, some users may want to branch to a more detailed diagnostic questionnaire while others are satisfied with the simple screening results. Again, this is not possible in the prior art and is easily accommodated within the present invention.

Therefore, the primary object of the present invention is to augment the functionality and usefulness of the branching and other logical analyses that computers have introduced into questionnaire administration through means that:

a) permit multiple users interfacing with the same system (either a stand-alone computer or through a server over a network like the Internet) to access questionnaires that may be customized for their specific needs and administer them through a user interface (e.g. a JAVA applet). For example, an oncology physician's assistant may select a specific oncology relapse prevention questionnaire for administration to a patient wherein the questionnaire has had no user-defined modifications. However a second physician's assistant may choose the same questionnaire from the same web site, but this user has defined additional logic that branches at the end of the questionnaire to a pain severity questionnaire if answers to the relapse questionnaire have clinically significant pain scores. In both cases, the same questionnaire has been selected, but in the second case it has been modified to meet the additional needs of the second physician. For the patients, they both have selected the same questionnaire with no awareness that other patients may be receiving different questions from different "behind the scene" rules.

b) allows advanced logic that can be applied to questionnaires and batteries of questionnaires beyond the traditional sequencing changes seen in the prior art. Beyond skipping data elements or changing the sequence order, the current invention allows for a plurality of other advanced logic. For example, a web site may wish to provide customized site content based on user needs and preferences. An on-line questionnaire may assist users in selecting the preferences and settings that tailor the site to their needs. Rather than having various questionnaires for different combinations of age, language, and reading levels, the customized advanced logic controller of the present invention could change the wording of one standard set of questions without altering the meaning of the question but alter the reading level or change the language of presentation to match a user's education. Or more fundamentally, the customized logic could delete, add to, or modify the advanced logic analysis 105-1A or advanced logic decisions 105-1B of the standard sequence controller 103 shown in FIG. 1.

c) provides "policing" of logic within a user hierarchy, where a superior (e.g. the chair of a medical department in a hospital as compared to attending physicians within the department) can set customized logic that limits the customizable options of subordinates (e.g. the attending physicians or medical students). If a superior changes his/her logic, the system must police itself and ensure that obsolete or overridden logic is removed from the system for each of the subordinates.

These primary objectives of the present invention produces many advantages, including wider applicability of a data collection system, greater functionality and utility for users, lower costs and time for customization, and more useful branching logic options. Still further objects and advantages will become apparent from a consideration of the ensuing description and drawings.

SUMMARY OF INVENTION

In accordance with the present invention we define a sequential data collection system with standard or predefined logic units that control aspects of the data collection process and are modified further by user-defined or customized logic units. The user-defined modifications can be implemented in such a way that the entire system does not need to be redesigned, configured and deployed. Any new logic can be easily implemented, without requiring any direct changes to be made to the existing (current) systems.

The custom controlled data collection system of the present invention is implemented by defining desired advanced logic either directly in the relevant database or through a graphical user interface. Once defined and where customized advanced logic is required, the sequential data collection system operates to execute the desired (custom) series of advanced logic units. A continuous series of advanced logic units can be executed, or certain advanced logic units can be executed conditionally, based on the success or failure of prior advanced logic units, or based on some other condition.

The custom controlled data collection system of the present invention leads to a variety of benefits that will be detailed throughout this discussion and examples. Most importantly, by separating the logic from the questions and data collection interface such a controller allows for real-time changes to advanced logic, allowing each implementation of the standard data collection elements to be individualized without system shutdown and system redesign. Other users can continue to use the system and receive their standard or customized questionnaires, while another user is modifying their unique user defined logic units. As a result, a single data collection environment can exhibit a plurality of instances or embodiments all run by the same control system.

Such a controller can extend the useful application of a base (standard) data collection system, without requiring direct changes to the standard sequence controller or the standard data elements. Such a controller allows for the customization of advanced logic based upon aspects or information deemed important to each user and application. This allows for the introduction of new advanced logic while mitigating the cost of doing so. In addition, the multiple methods by which customized advanced logic can be defined and modified by users does not require any programming expertise, which further reduces the cost of making system changes. Graphical user interfaces (GUIs) can allow even novice users to easily alter their logic whenever required.

BRIEF DESCRIPTION OF DRAWINGS

The accompanying drawings, which are incorporated in and constitute a part of the specification, illustrate an exemplary embodiment of the present invention.

FIG. 3 is a block diagram of an exemplary embodiment of a logic unit;

FIG. 4 is a sample pre-compiled text of a logic unit;

FIG. 6 is a block diagram of an exemplary embodiment of an action;

FIG. 7 is a sample pre-compiled text of an action with multiple embedded methods;

DETAILED DESCRIPTION

Figure 2:
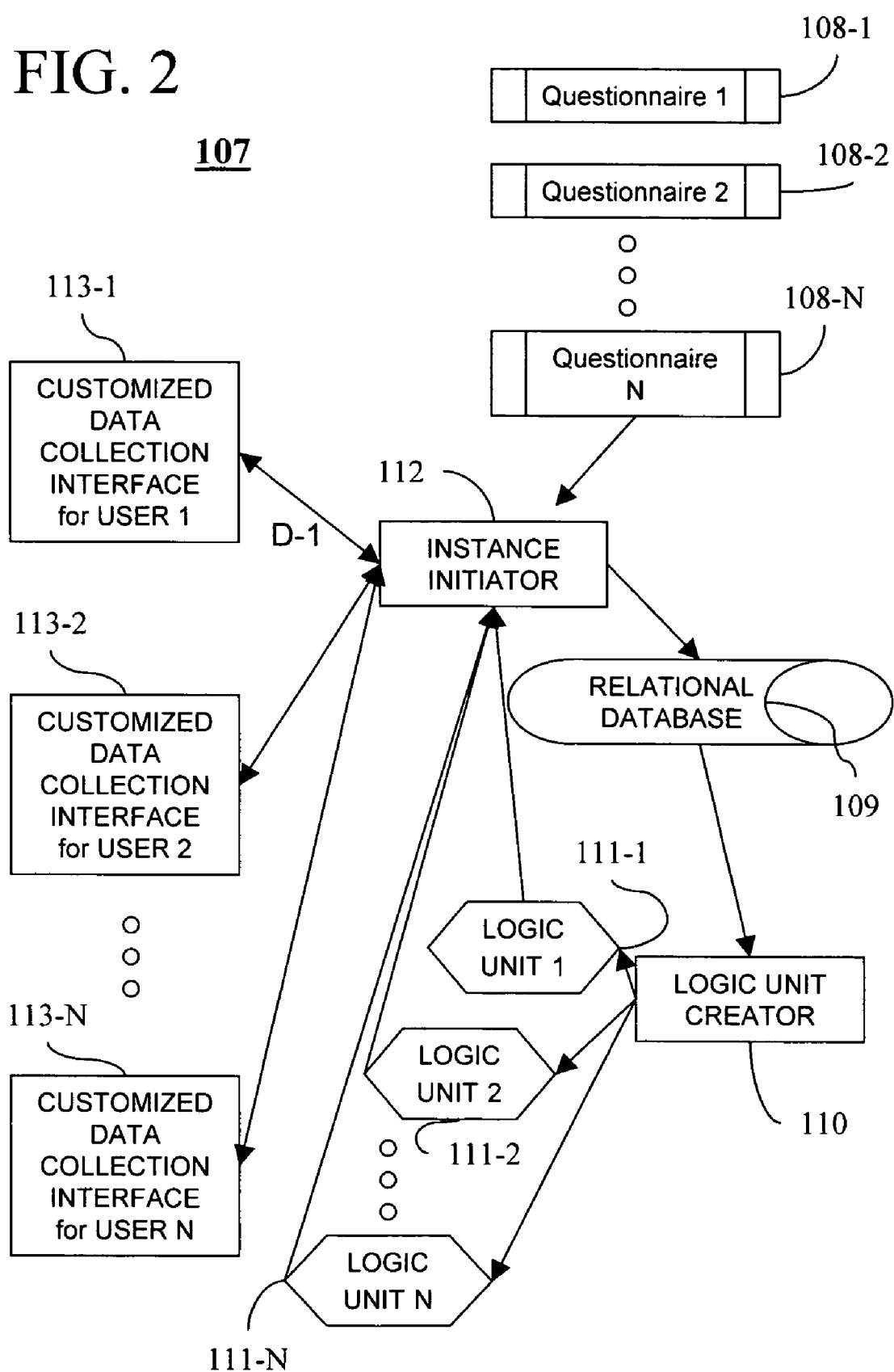
FIG. 2 is a flowchart of the customized data collection system according to an exemplary embodiment of the present invention.

FIG. 2 shows an overview of a custom controlled data collection system 107 that coordinates the presentation of one or more questionnaires (108-1 through 108-N) to a plurality of data collection interfaces (113-1 through 113-N) in accordance with the present invention. All components of the system can be located in the same computer or distributed over a network like the Internet with the data collection interfaces residing in a client-side application and the other components in FIG. 2 residing on a server. Within the preferred embodiment, the data collection interface is a computer with a display. In other embodiments the data collection interface could be a telephone system using an interactive voice response technology or any other interface to assist in the collection of data from human users.

At the heart of the preferred embodiment of the present invention are logic units (111-1 through 111-N) stored in text format within a relational database 109 that are compiled on demand by a logic unit creator 110, and then loaded with standard questionnaire sequences by a instance initiator 112 before being transferred D-1 to a specific data collection interface 113-1.

FIG. 3 shows an exemplary example of a logic unit 111. Within the preferred embodiment, the system uses logic units and its various subcomponents to carry out the means to store and execute predetermined and customized logic. Each logic unit 111 has a trigger 121 that holds information about the environmental events that will execute the logic unit's analysis 122. Extending well beyond the prior art, within the preferred embodiment there are numerous environmental events that could trigger the logic unit. These include: before customized logic units are loaded by the instance initiator (FIG. 2 112); as soon as the specific logic unit is loaded; after all logic units are loaded; as a subset of questions is loaded into the display or rendering device of the data collection interface; as a subset of questions is replaced in the display or rendering device of the data collection interface; before a specific question is presented by the data collection interface; after a question's answer is updated; after a question loses focus; after the entire questionnaire is finished; or never. However, in other embodiments the triggering events can be any environmental or programmatic event and is not limited to those listed in the preferred embodiment.

The logic unit is further comprised of an analysis 122 that uses variables to produce two or more results. In the preferred embodiment the results are either true or false. Any data element, programmatic state, or environmental variable can be used as arguments in the analysis to generate a result, including: answers to questions, answers to questions in previous administrations, the amount of time the user has taken to answer one or more questions, the number of times a question's answer has been changed, and the number of previous administrations a user has had of the same questionnaire. Immediately following the returned result, the logic unit executes an array of actions (123-A through 123-N) associated with the specific result. In some cases, a specific result might have no actions associated with it, leaving the system in the same state as before the logic unit was triggered.

FIG. 4 shows how a logic unit is stored within a preferred embodiment. Each logic unit is stored in the relational database (FIG. 2 109) in text form as shown in the example 130. Here the various parts of the logic unit are separated by a unique text string that can be used to split the text into various substrings (e.g. "qq13"). In this example, the logic unit starts with the trigger text code of "36" which schedules this logic unit to be triggered just before a specific question is presented to the user within the data collection interface. It also schedules the trigger to execute the analysis before any customized logic units are loaded by the instance initiator. In the preferred embodiment each logic unit's analysis is functionally equivalent to one action (e.g. FIG. 3 123-A).

Figure 5:
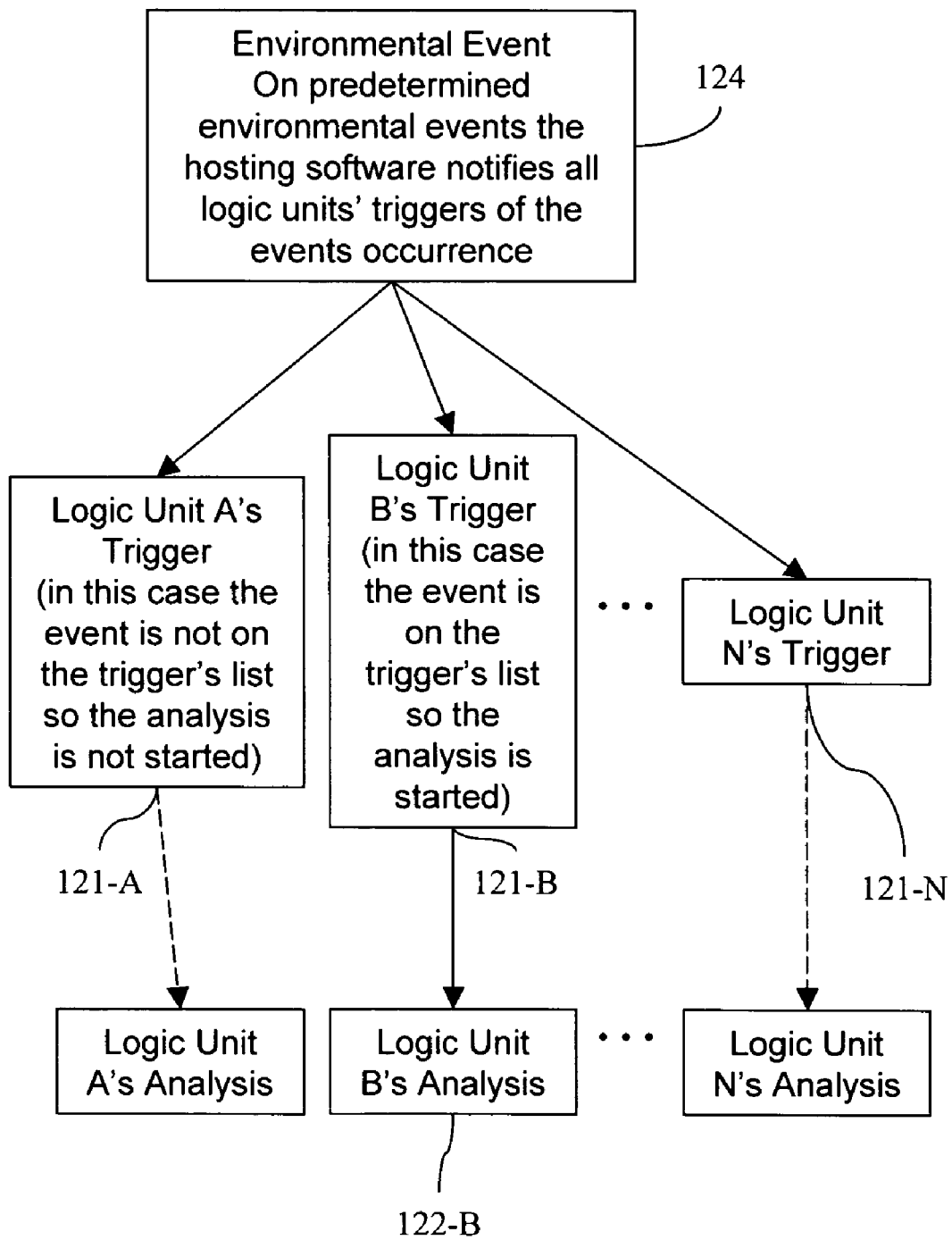
FIG. 5 is a flowchart of an exemplary embodiment of the triggering means within a logic unit.

FIG. 5 shows an example of how the triggering process works within the preferred embodiment. After a predetermined environmental event 124 occurs, the software program notifies all logic unit triggers (121-A through 121-N) that the event has occurred. Only if the event is in the trigger's list, is the logic unit's analysis (e.g. 122-B) executed.

FIG. 6 shows an overview of an action 123 within the preferred embodiment. Similar in function to the logic unit's trigger, the action also has a trigger 125. The trigger's list of environmental events is a subset of its parent logic unit's list. This functionality allows the same logic unit to be run at different times, yet achieving different results. If the triggering event is on the action's trigger list, a primary method call 126-A is executed. The action has at least one primary method call and optional secondary method calls (126-B through 126-N). If there are secondary method calls, they are embedded method calls within the primary method as seen in the example (FIG. 7) 128 and will be explained in detail below. The sample action shown can be found embedded in the sample text of the full parent logic unit (FIG. 4 130). The components of the action are also separated by a different, but unique, text string (in this case "qq15").

Figures 8, 9:
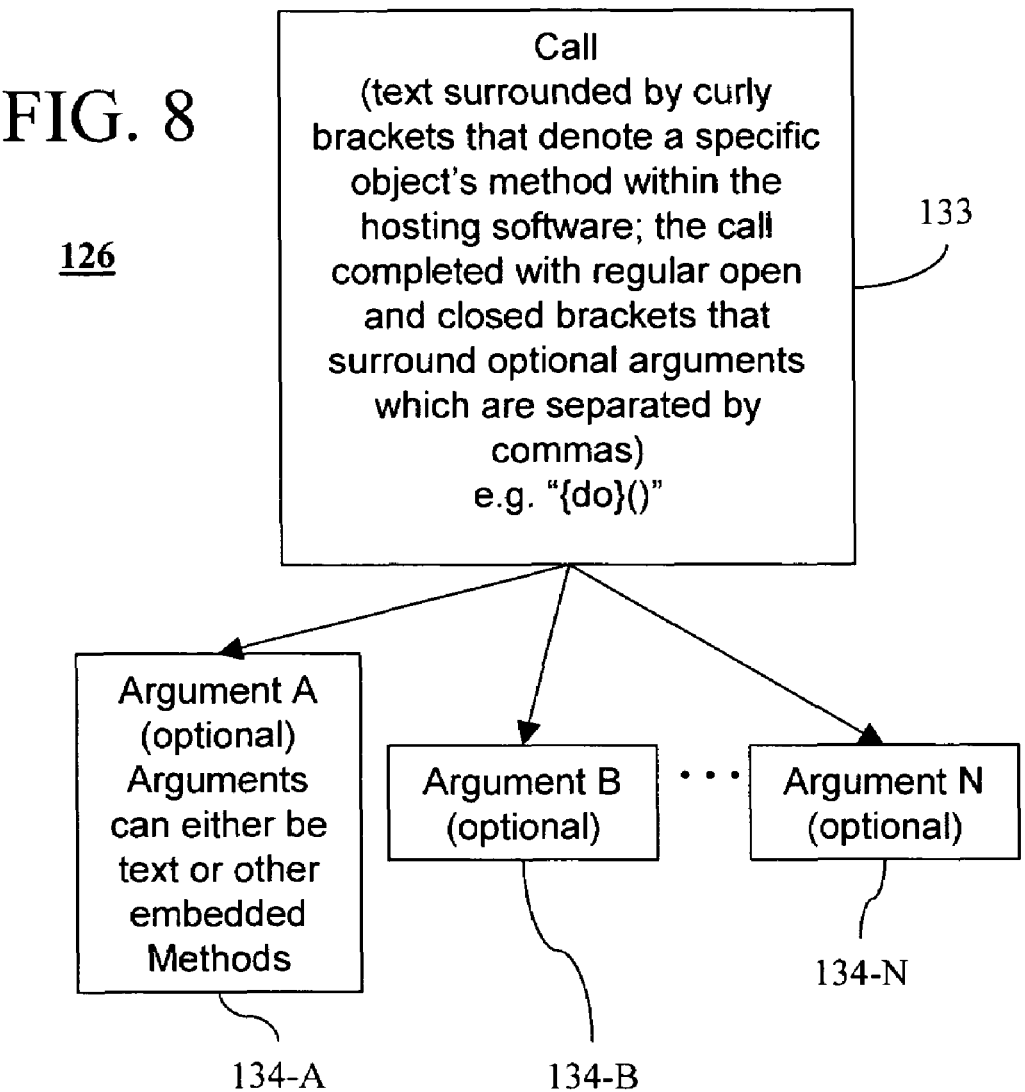
FIG. 8 is a block diagram of a method.
FIG. 9 is a sample pre-compiled text of a method with sub-methods as arguments.

FIG. 8 shows the structure of a method call 126. Each method call has a call statement 133 and optional arguments (134-A through 134-N) separated by commas. The call statement is surrounded by curly brackets and immediately followed by open parentheses to hold optional arguments. The call text refers to a specific programming method within the system's programming language, and each argument is either a text string or an embedded method call. In the example 132 (FIG. 9), the call statement is "do" and there are five arguments, each of which is another method call. Each of these five embedded methods has two arguments which are not embedded methods but simply text arguments. The first embedded method call is "setQBlockAnswerReadOnly," which, when executed, takes the presentation of question "560" and sets its answer to read only, preventing any further modification of the answer by the user. This functionality is very helpful in reminding users of answers to a previous question from another questionnaire or administration to which there will be follow-up questions. When the primary method call is executed, it attempts to use the listed variables in performing its function. If, however, one of the variables is really an embedded method, it executes the necessary embedded methods first in order to return the necessary text variable arguments. In this example, the call statement expects the arguments to be sub-methods and executes each sequentially. In this way very complex logic can be coded in a simple scripting language and used within the data collection system. Method calls can call the execution of any other programming method within the system. In some cases, these method calls might skip to or pre-fill answers to questions modify the arguments of other method calls, or, most powerfully, create brand new logic units that are stored in the database for future use.

By keeping the rules and logic for a data collection system in text form and separate from the questions that make up various questionnaires, the functional utility, longevity, and ease of maintenance are all augmented, while at the same time allowing for individualized customization of questionnaires.

Figure 10:
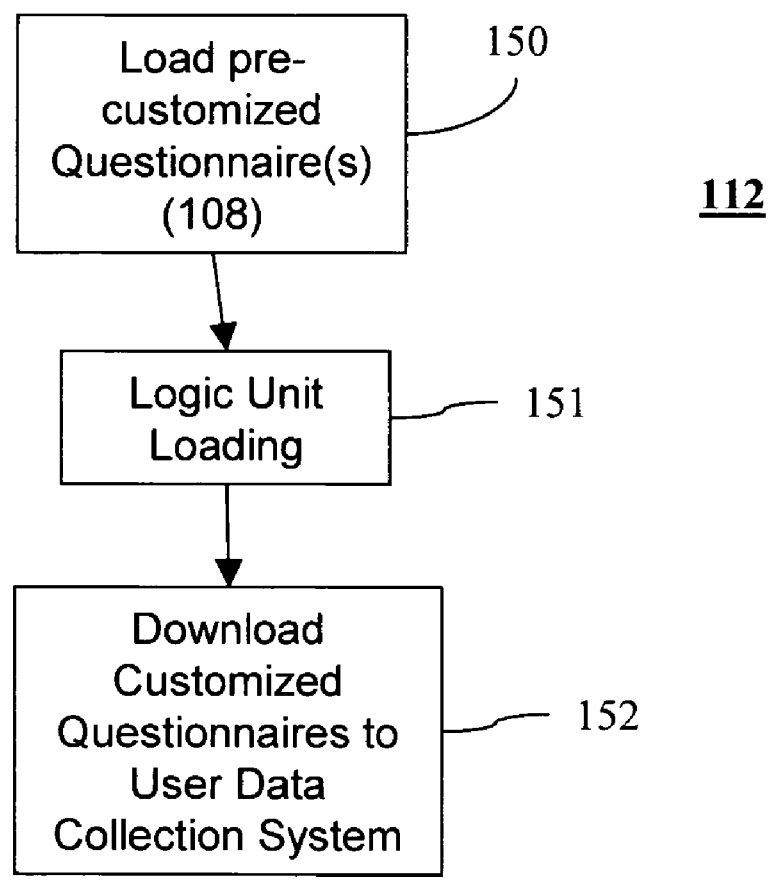
FIG. 10 is a flowchart of the processes within an instance initiator.

FIG. 10 shows the sequential processes of the instance initiator 112. The instance initiator first loads 150 predetermined and pre-customized questionnaires. It then loads 151 the necessary predetermined and customized logic units created by the logic unit creator 110, and upon completion, downloads 152 the fully loaded customized questionnaire to the requesting data collection interface.

Figure 1:
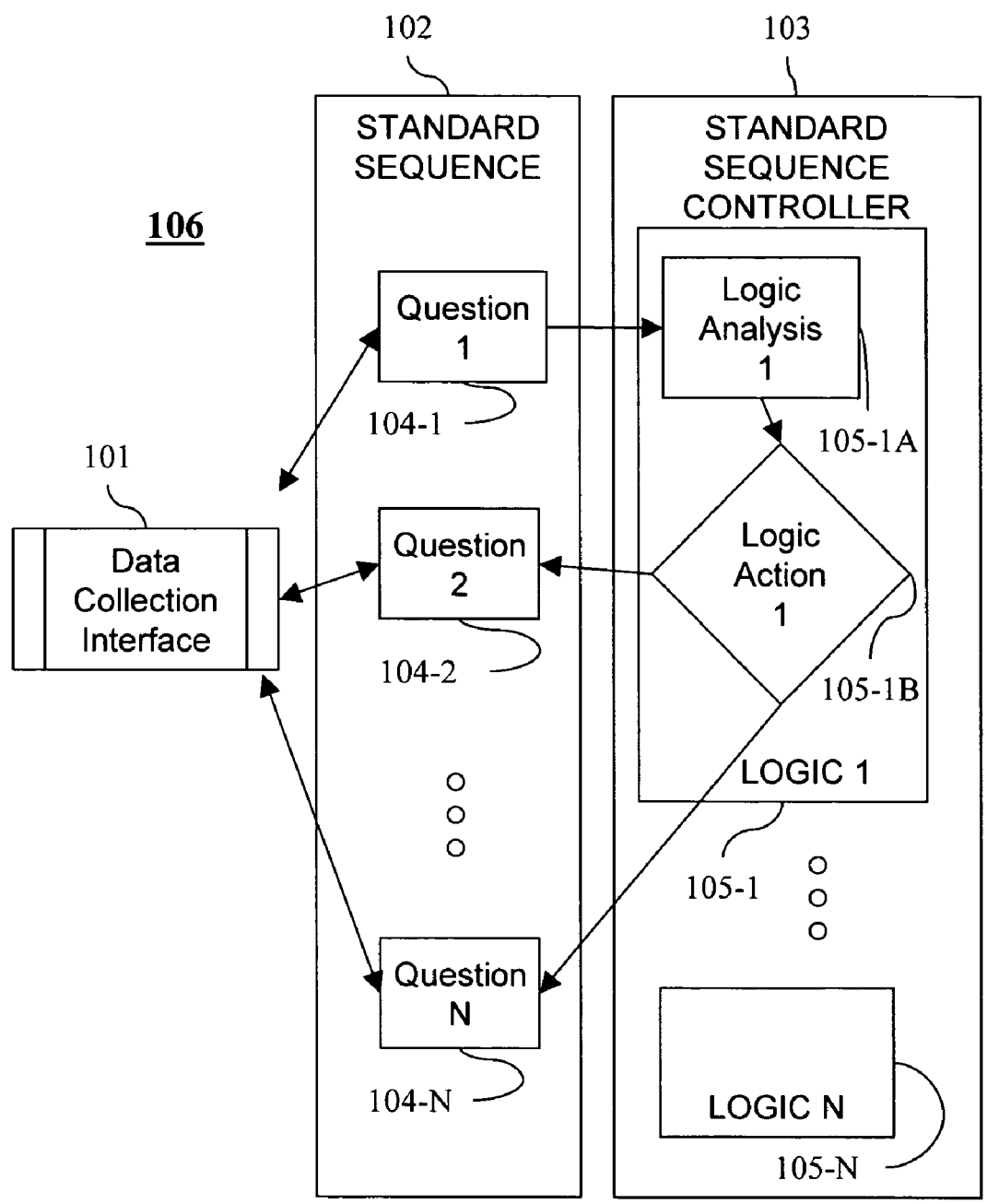
FIG. 1 is a flowchart of the prior art.
Figure 11:
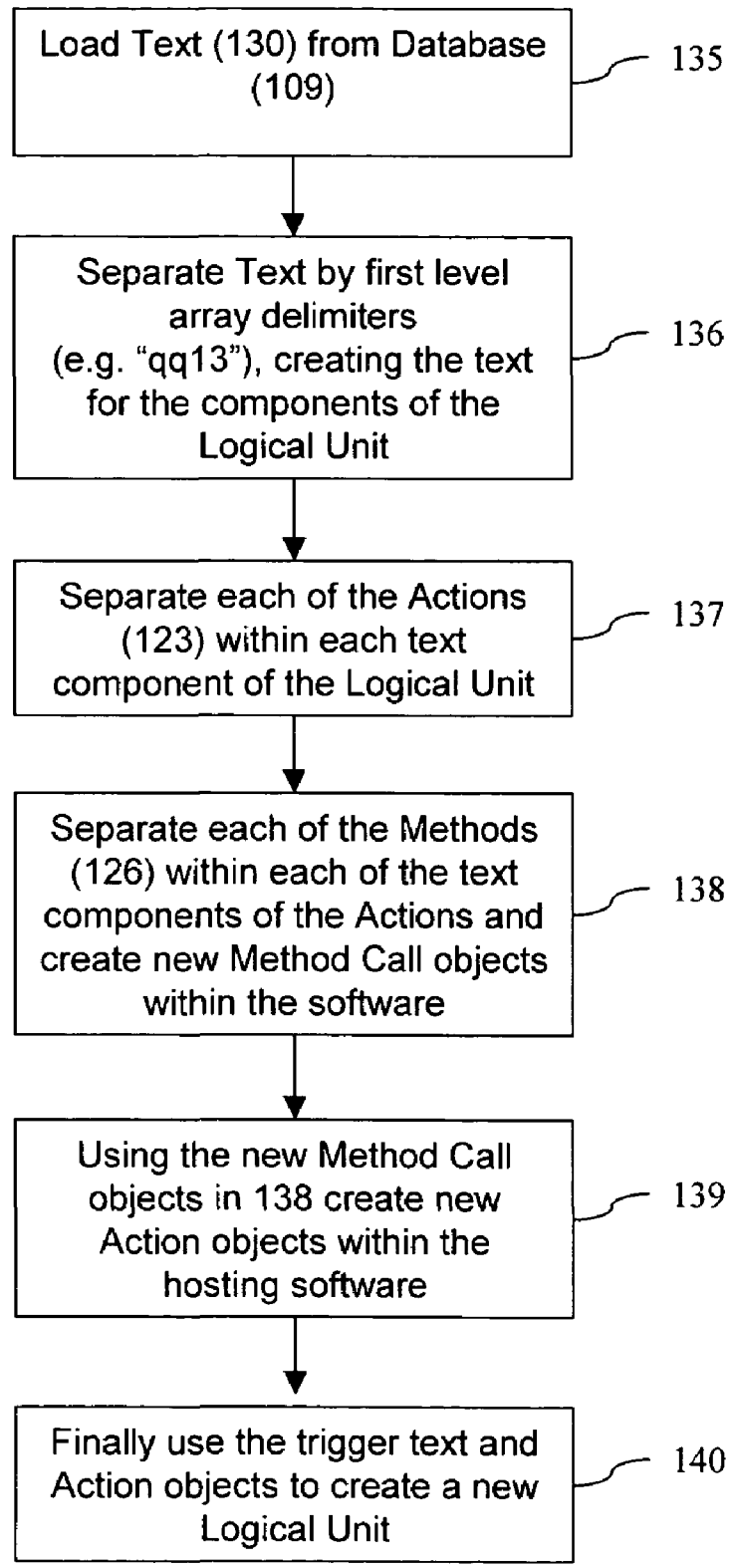
FIG. 11 is a flowchart of the processes within a logic unit creator.

FIG. 11 shows the steps taken by the logic unit creator (FIG. 2 110) of transforming the logic unit text (FIG. 4 130) into the logic units (FIG. 2 111-1-111-N) that are loaded by the instance initiator (FIG. 2 112). First, the logic unit creator retrieves 135 the required text from the relational database (FIG. 2 109). It then separates 136 the text components into their respective parts using the specific text separation string. It then separates 137 each action into its text components, and then compiles 138 each method call. Once all method calls are compiled, the actions are compiled 139, and finally the full logic unit is complied 140 and made ready for the instance initiator.

Figure 12:
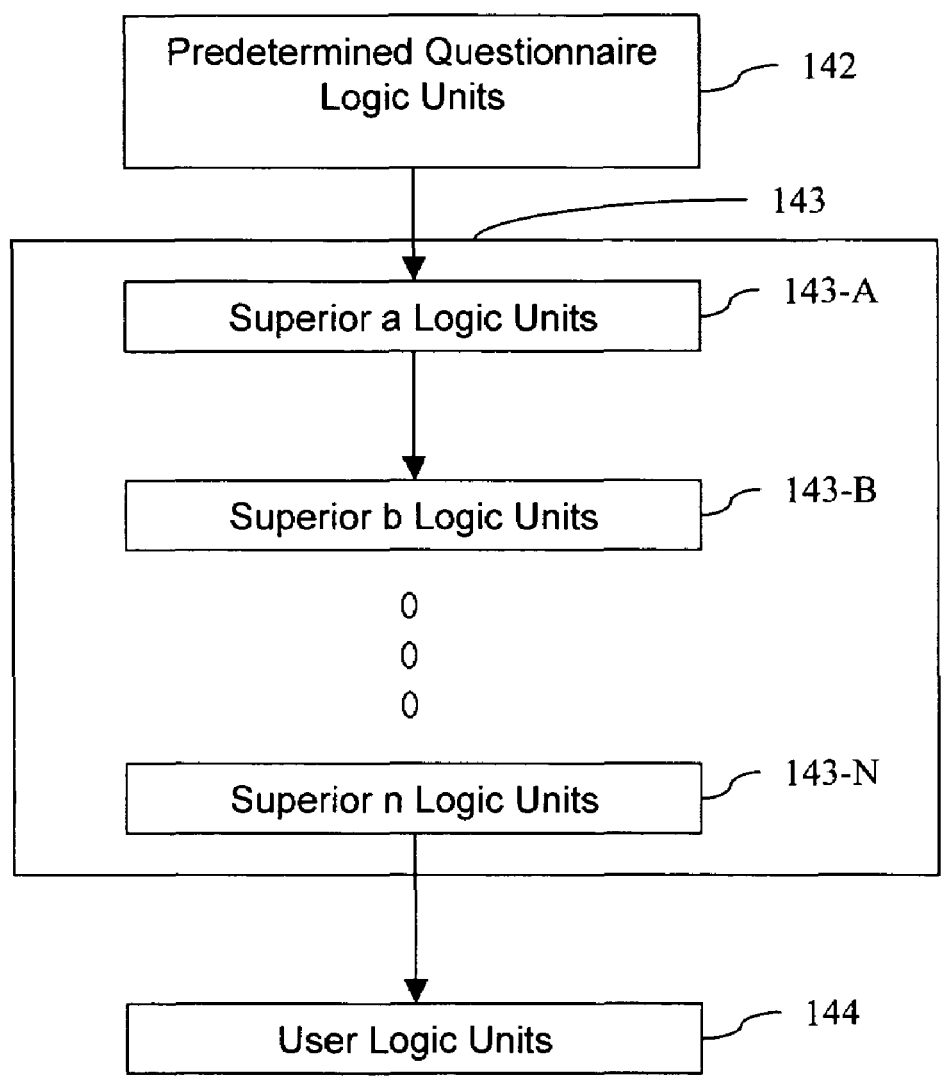
FIG. 12 is a flowchart of the loading order of logic units within the instance initiator.
Figure 15:
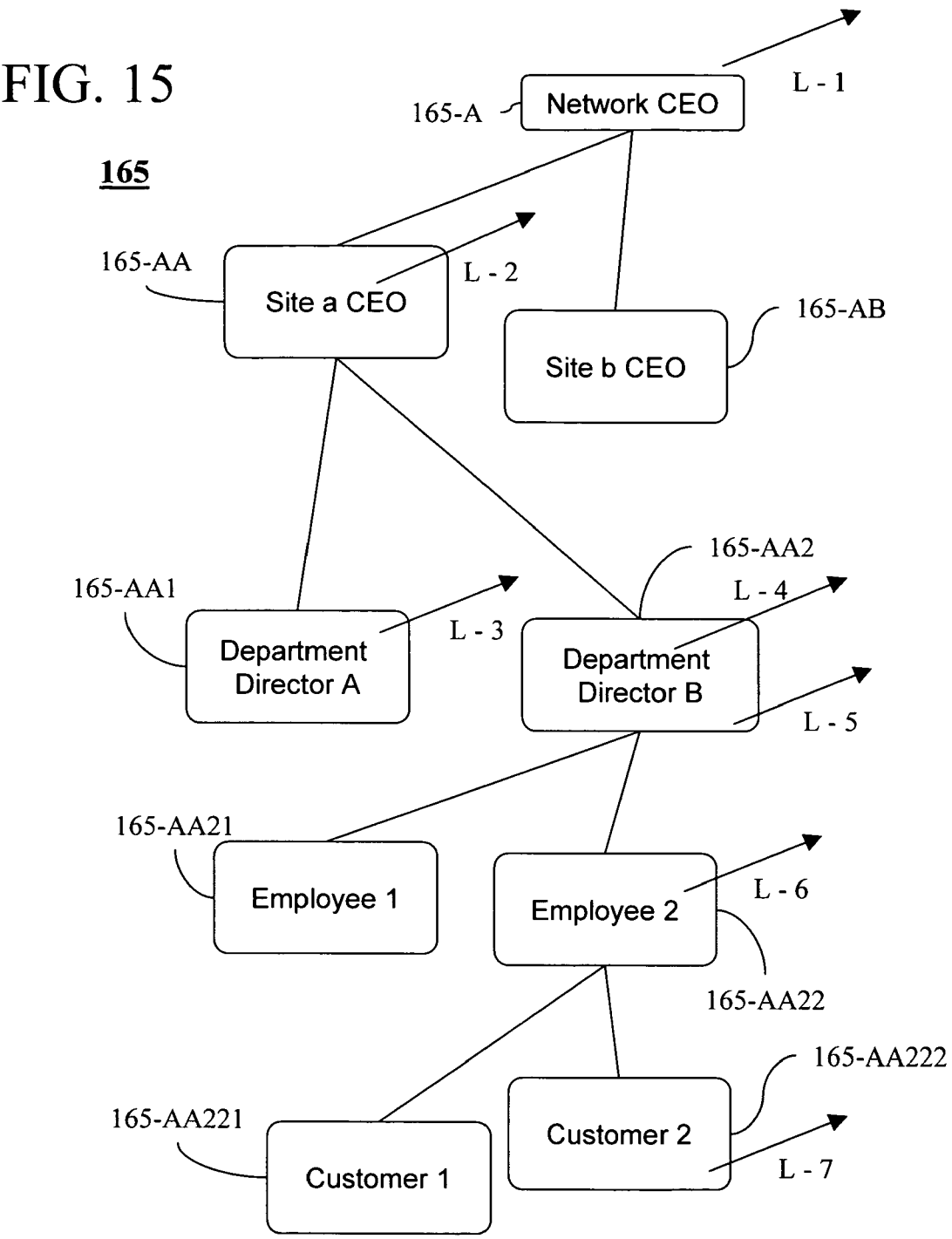
FIG. 15 is an example of a user hierarchy.

FIG. 12 shows the steps taken by the instance initiator to properly load the required logic units so that user restrictions and authority can be properly policed in the preferred embodiment. First, any predetermined logic units are loaded 142. By loading these units first, they can immediately (if required) execute and set certain customized restrictions on the data collection system and questionnaires. For example, to maintain the validity of some questionnaires and tests, it is essential to maintain the order and presentation of questions, creating a logic unit that blocks modification of the sequence of questions. For other survey questionnaires, this is not necessary. Next, hierarchically superior user logic units for requested questionnaire are loaded (143-A through 143-N) in order of superiority. And finally, the specific user's logic units are loaded 144. FIG. 15 shows a sample hierarchy that may help understanding the need for this functionality and will be explained in detail below. In this way, if a superior user has added or modified a logic unit that may render a previously acceptable logic unit obsolete, the loading operation has a chance to police, delete, and effectively edit subordinate logic units automatically as seen in FIG. 13.

Figure 13:
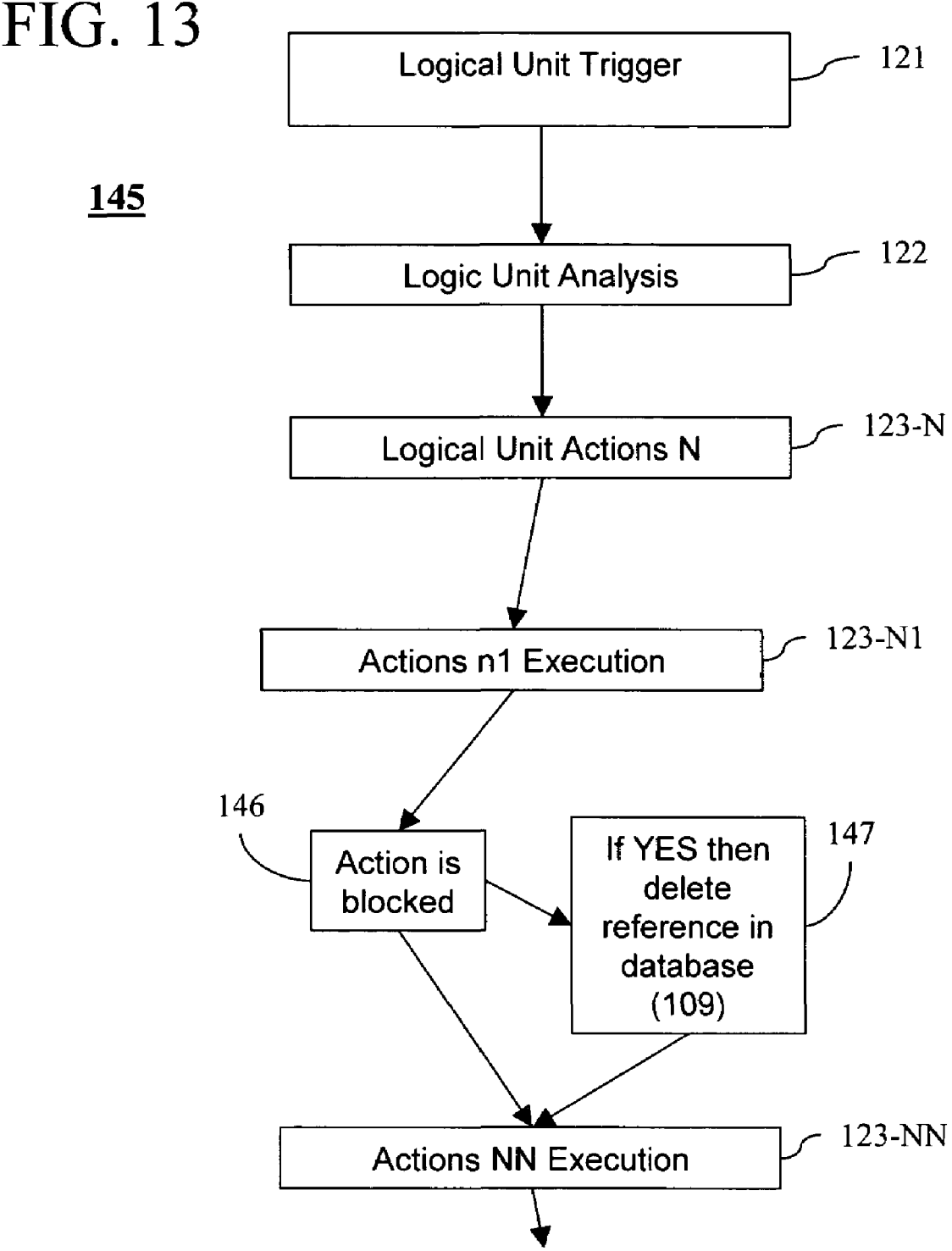
FIG. 13 is a flowchart of an exemplary embodiment of the policing means to delete obsolete logic units.

FIG. 13 shows how obsolete logic units and their components are automatically policed and edited as they execute. As previously discussed, after the logic unit trigger 121 executes analyses 122, a set of related actions 123-N are executed 123-N1. Upon execution, if the action is blocked or prevented from carrying out its function 146, a message 147 is sent to the database (FIG. 2 109) to delete the action. The process continues by executing other actions 123-NN in sequence. In this way, when the predetermined logic of a questionnaire is changed, or as a superior user modifies customized logic, the entire database does not need to be scanned and policed immediately. This just-in-time policing provides a simple and efficient mechanism to purge the database of obsolete code.

Figure 14:
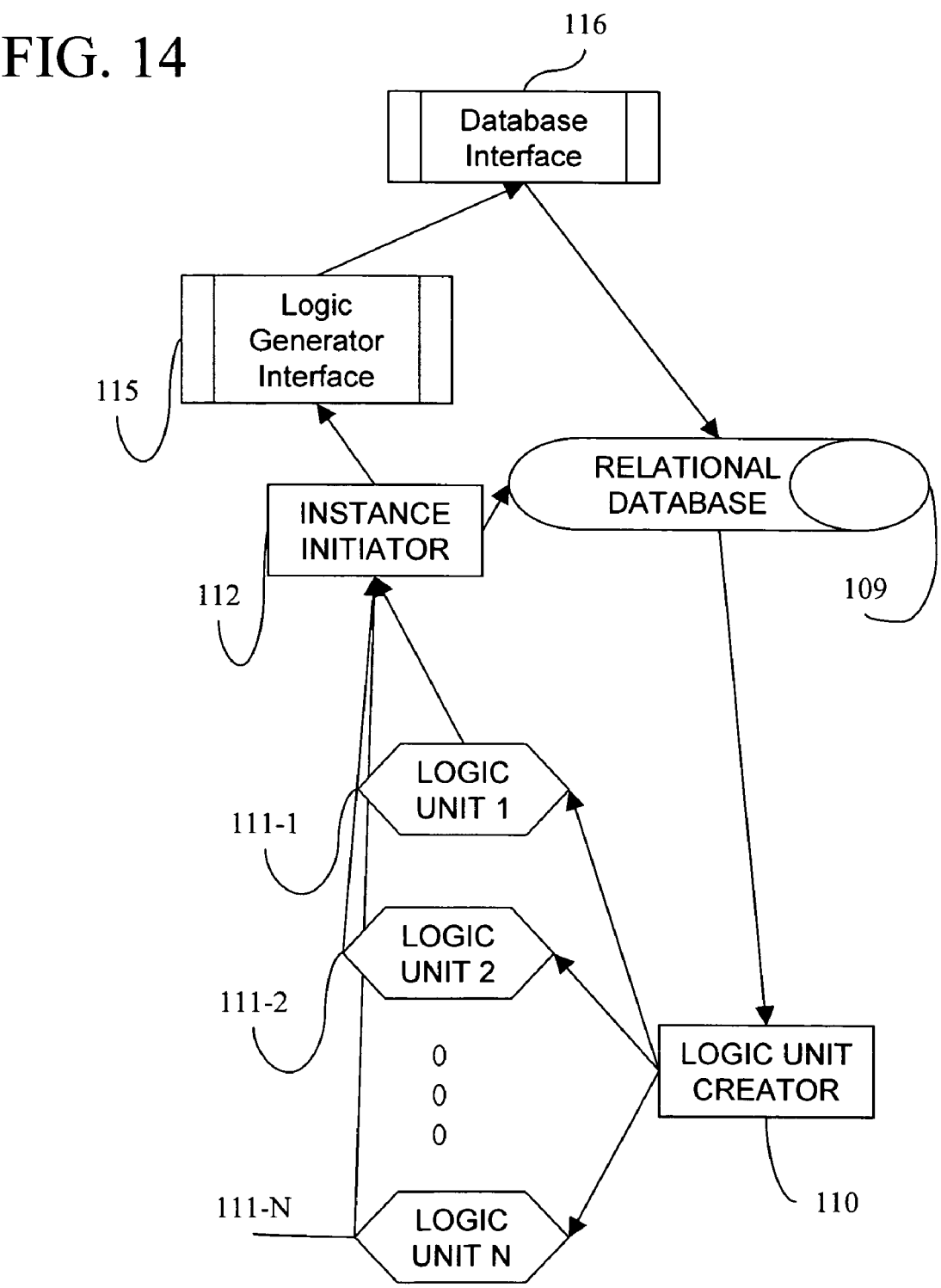
FIG. 14 is a block diagram of several options to create and edit logic units.

FIG. 14 shows the two means for modifying and adding logic units into the system. First, a direct interface 116 tied directly to the database allows experienced users to add and edit logic units in their text form (FIG. 4 130). Second, using the same processes (FIG. 2 107) to generate and administer customized assessments can be used to send logic units to a logic generator interface 115. Here, a menu driven or graphically driven editor can be presented to allow inexperienced users to edit with help and assistance. In either case, the modifications are converted to text form and stored in the database 109.

FIG. 15 shows a sample hierarchy of users 165 and their subordinate and superior relationships. The discussion of this diagram will demonstrate some of the powerful advantages of the present invention. As these interdependent relationships are discussed, the uses and advantages of the present invention will be exemplified by discussing how the present invention assists each user in meeting their needs. At the top of the hierarchy is the CEO of a network of hospitals 165-A. This network CEO would like to use a customizable data collection system to meet several diverse but related needs of her organization. First, the organization is accredited by the Joint Commission on Accreditation of Healthcare Organizations (JCAHO) and must meet certain outcome requirements across the entire network. Second, she has Continuous Quality Improvement (CQI) teams that work to measure and improve the quality of care within the network. Third, she would like to assist doctors within the system to make the best possible diagnoses for their patients within their respective and diverse disciplines. And, finally, she has charting requirements that an automated data collection system may off-load some of the work onto patients that are answering questions that will simultaneously assist with their care. To meet these diverse needs some aspects of the data collection system need to be rigid and others flexible and customizable. To create a common data platform to meet the needs of JCAHO and her CQI teams, a short, but uniform questionnaire (for example, 108-N) is selected to be used across the entire network. To meet the other needs, she will leave it up to the professional subordinates within her network to make the best decisions. Therefore, only one logic unit is created (L-1).

The text code for this logic unit is "64qq13{linkAssessment}(2342)". The number "64" complies to trigger the logic unit's analysis to run as soon as the logic unit is loaded by the instance initiator (FIG. 2 112). "qq13" is the unique text separator of logic unit parts. As noted above, in the preferred embodiment the analysis (FIG. 3 122) is simply one action (FIG. 3 123). Each action and method call return a text result which can either be stored as arguments in parent functions, return a result (e.g. "TRUE"), or notify the system that an action has been blocked and should be deleted. Therefore, in the case where no analysis is needed (i.e. the action will always be performed under the triggering conditions) the action 123-A can be placed in the analysis 122 location, leaving the action arrays blank. This is precisely what is seen in the logic unit example of this paragraph. The method call (FIG. 6 126) is, "{linkAssessment} (2342)." The call "linkAssessment" executes a method within the code of the instance initiator to fetch questionnaire 108 number "2342" and append its questions to the end of the primary questionnaire that was requested by the user. For example, if a psychiatrist 165-AA22 asks one of his patients 165-AA221 to go to the hosting website (where an instance of the present invention is located) to complete a psychiatric survey, the survey will be appended with the questions from questionnaire 108-N, helping the network CEO meet her objectives. Subordinate to the network CEO are a number of hospital CEOs with similar needs. However, since their superior has already mandated a standard network-wide CQI tool, they can not get access to this logic unit to edit or delete it. Hospital A's CEO 165-AA believes that questionnaire 2342 must be administered first to ensure that as much data as possible is available to the CQI teams, and assumes that some patients will get tired and stop the data collection process before it is finished. Therefore, a logic unit is created to move the network required questions to the beginning of any question sequence (L-2). By contrast, hospital B's CEO 165-AB believes that it will be best to assist the doctor's in collecting the relevant patient information first, and therefore leaves the default order of presentation set by the superior user.

Subordinate to the CEO of Hospital A are the chiefs or chairs of various departments like oncology 165-AA1 and psychiatry 165-AA2. To assist in documentation requirements, diagnosis, and treatment planning each of these chairs chooses a questionnaire that is specific to their specialty and creates a logic unit that requires this assessment of any subordinates (L-3, and L-4). Due to CQI feedback that the inpatient units are under performing in the treatment of mania, the chair creates an additional logic unit (L-5) that requires the mania subscales of the questionnaire to be administered to all patients, preventing individual physicians from turning this subscale off.

Figure 16:
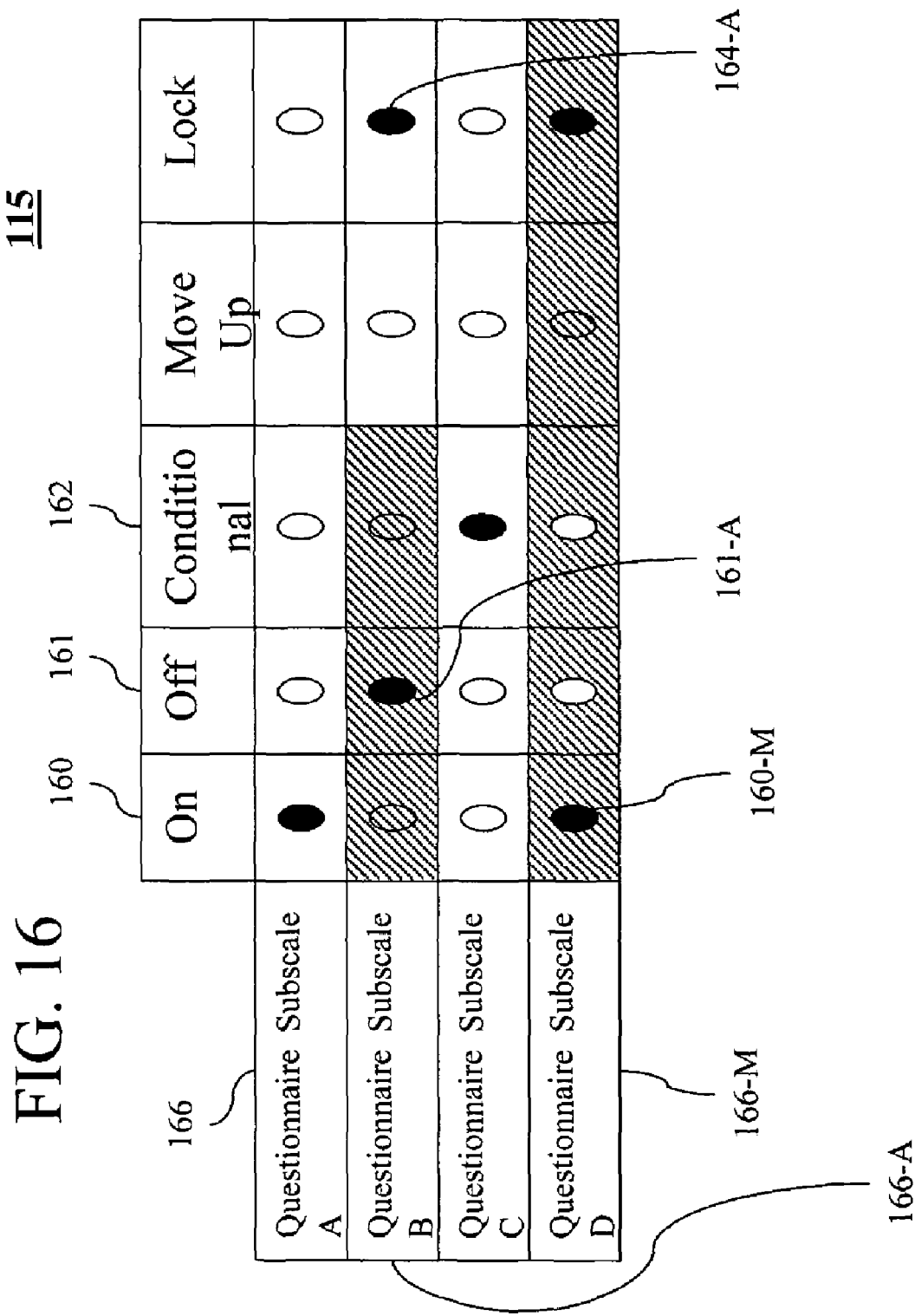
FIG. 16 is a sample screen from an exemplary embodiment of the interface to modify logic units.

Subordinate to the psychiatry chair are attending psychiatrists. Psychiatrist 165-AA21 does not customize the system and no additional logic units are created. Psychiatrist 165-AA22 would like to track the progress of treatment for his patients and creates a logic unit that adds the same questionnaire to additional time periods during inpatient stays. Psychiatrist 165-AA22 also creates a logic unit L-6 that further customizes this specialty questionnaire for his clients. Since this psychiatrist specializes in high functioning patients with depressive disorders, he does not wish to burden his patients with the subscale of the questionnaire that focus on Activities of Daily Living (ADLs). Since his superior has not placed any logic unit restrictions on his editing this subscale, his logic units will not be blocked from executing. Using the logic generator interface 115 as seen in FIG. 16, the psychiatrist turns off 161 the ADL subscales 166-A by clicking the correct button 161-A. Wanting to prevent subordinates from undoing this requirement, he further selects the lock button 164-A, which immediately disables further selections of the on 160, off 161, or conditional 162 buttons in that row 166-A. However, at any time in the future this psychiatrist can return to the interface and de-select 164-A, allowing additional editing by himself or his subordinates. Similarly, the chair of the department has used the interface in a similar process to require the Mania subscales 160-M. As the instance initiator 112 creates the logic generator interface 115 for the psychiatrist 165-AA22 it loads 150 the requested questionnaire 108 and relevant logic units 143 in the prescribed order (L-1, L-2, L-3, L-4, L-5, L-6). As logic unit L-5 is loaded, it is immediately executed rendering the interface to resemble line 166-M in FIG. 16. All buttons are disabled (denoted by being grayed) and are unable to be edited or unlocked by any subordinate user. Note the difference between the ADL Subscales 166-A where the locking has been made by the user that is currently using the logic generator interface 115, as compared to the Mania Subscales 166-M where a superior has clicked the locking mechanism. In using the logic generator interface 115, logic unit text is automatically generated for the user and sent to the database 109 for future or immediate use.

To finish the hierarchical example, the lowest users in the hierarchy are patients who will probably be blocked from making logic units directly. However, the doctor, or doctor's staff could do this on the patient's behalf. For example, if patient 165-AA222 has been hospitalized for a suicide attempt, but also has an eating disorder, an eating disorder questionnaire might be appended L-7 to just this client's questionnaire.

Figure 17:
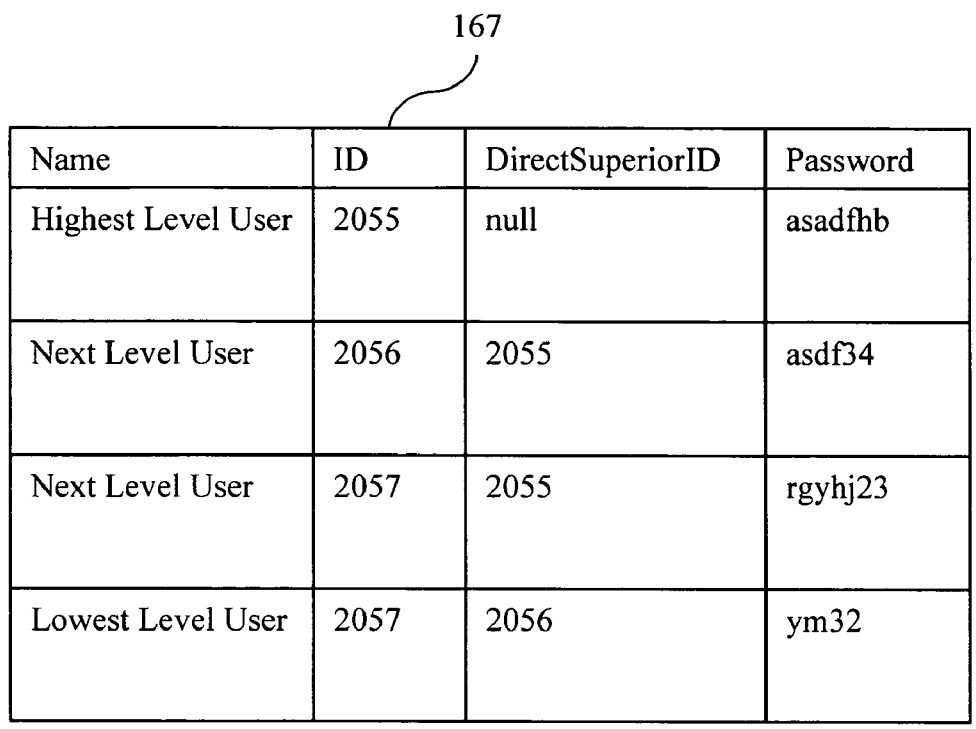
FIG. 17 is an example of a several database entries tracking user relationships.

FIG. 17 shows a sample table entry used in the preferred embodiment to track the hierarchical relationships between users. As can be seen in column 167, any user can be linked to their immediate and direct superior, and then to the superior's superior until a null entry is encountered. Using this method customized logic units associated with each user's ID and their superiors' can be easily located and loaded into the system.

There are many other fields where a customized data collection system can provide a powerful and unique solution. For example, an on-line centralized mortgage application service could provide standardized Fannie Mae mortgage questions and logic unit restrictions into the data collection system, while allowing local lenders to customize their unique questions and logical requirements, including any "non-conforming" loan offerings that do not require Fannie Mae compliance. After a loan applicant completes registration information including location, a set of predefined logic units could compile all local lender questions and logical requirements to render to the applicant a location specific customized questionnaire that yields all local lenders that would be interested in the applicant's loan. This would be an especially powerful solution for lenders who specialize in non-conforming loans while allowing the consumer seamless one-stop shopping.

In another example, a human resource department in a large corporation could create a job application web section that transparently customizes questions and presentation (e.g. division logos) to the unique needs of a hierarchy of users (central office, divisions, and then individual sites). After the applicant chooses the site to which they are applying, a division co-branded set of questions would be displayed for the applicant.

In this discussion, a number of powerful advantages of the present invention have been highlighted. First, by just creating a few customized logic units for several of the users, questionnaires have been modified to meet each user's needs. Second, by logging onto the same hosting website and requesting the same questionnaire (e.g. "intake assessment") each patient in the hospital network would receive the questionnaire tailored to their needs. Similar functionality is not possible in the prior art. Third, the flexibility of logic units have been demonstrated where some logic units express themselves differently at different times or under different conditions, allowing powerful logic to be coded and parsimoniously stored in memory. And fourth, the logic units are easy to edit, extending the usefulness, cost-effectiveness, and longevity of the data collection system into which it is embedded.

In addition, a number of alternative embodiments have been discussed to highlight the usefulness and scope of the invention beyond the preferred embodiment. Other embodiments will be apparent to those skilled in the art from consideration of the specification and practice of the invention disclosed herein. It is intended that the specification and examples be considered as exemplary only, with a true scope of the invention being indicated by the following claims.

I claim:

1. A computer tangibly embodying a computer program for individually tailoring computerized questionnaire administration executable by a plurality of computers, the computer program comprising computer instructions for:
   providing a data collection interface to a plurality of users;
   storing one or more predetermined logic units;
   storing one or more user defined logic units;
   loading said predetermined logic units and said user defined logic units in a prescribed order; and
   defining and tracking said users, said user defined logic units, and each of said user's hierarchical relationship to other said users,
   whereby said computer instructions for loading first loads hierarchically superior user defined logic units before loading other user defined logic units and ensures that superior user defined logic units are executed first,
   whereby the administration of said questions in a questionnaire is altered by executing said loaded predetermined logic units and/or said loaded user defined logic units, and
   whereby said questionnaire is customized in real time so that, when two or more users of said plurality of users request said questionnaire, each of said two or more users are administered different questions based on answers submitted by said two or more users.

2. The computer of claim 1, wherein said computer program further comprises computer instructions for editing logic units.

3. The computer of claim 1, wherein said computer program further comprises:
   a testing means to analyze one or more environmental variables, programmatic states, and stored data elements to form a result;

an execution means to trigger execution of said testing means before or after one or more programmatic events; and a set of one or more actions that will run in a prescribed order for each of said testing means results.

4. The computer of claim 3, wherein said execution means control said computer program, including one or more of the sequencing, wording, response options, and branching to other said questionnaires.

5. The computer of claim 3, wherein said actions further comprise altering means to modify said logic units, whereby the functionality of said logic units can be altered for a subset of said users.

6. The computer of claim 5, wherein said computer program further comprises blocking means to lock one or more of said logic units from modification by other logic units.

7. The computer of claim 6, wherein said blocking means further comprise conditional means to lock only a subset of said other logic units from modifying a logic unit.

8. The computer of claim 1, wherein the computer program further comprises computer instructions for policing obsolete logic units that have been blocked from execution by previously loaded logic units.

* * * * *